Patented June 23, 1931

1,811,799

UNITED STATES PATENT OFFICE

HIRAM S. LUKENS, OF PHILADELPHIA, PENNSYLVANIA, ASSIGNOR TO SOLIDON PRODUCTS, INC., OF PHILADELPHIA, PENNSYLVANIA, A CORPORATION OF DELAWARE

MAGNESIUM OXYCHLORIDE MIXTURE AND METHOD OF MAKING THE SAME

No Drawing.  Application filed November 12, 1929.  Serial No. 406,560.

The object of my invention is to provide cementitious material of the magnesium-oxychloride type which will avoid the tendency to deteriorate in use and give uniform and dependable results.

Heretofore magnesium oxide and magnesium chloride solutions have been mixed in various proportions to give cementitious products of various degrees of stability. Whether combined with aggregate or not, the results have been variable, and in many cases the articles have deteriorated in the mechanical properties after use. These effects have been commonly attributed to the influence of atmospheric conditions; and various attempts have been made to protect material from atmospheric agencies, particularly moisture. The hygroscopic properties of magnesium chloride, and the tendency for magnesium oxide to react with gases contained in the atmosphere to form magnesium hydroxide or magnesium carbonate have been commonly regarded as the primary causes of deterioration, and, in some cases, disintegration.

I have discovered that, aside from the previous thermal treatment of magnesium oxide, the state of subdivision of the oxide, the temperature of the mixture and the amount of agitation of the mixture, which have some influence on the properties of the plastic material; two combined features are of great importance in avoiding deterioration and giving uniform results. These are the ratio of magnesium oxide to magnesium chloride, and the concentration of the magnesuim chloride.

I have discovered that when magnesium oxide is brought into contact with magnesium chloride solutions, the magnesium oxide dissolves to a considerable extent, and if the solution be filtered from the still undissolved magnesium oxide and allowed to stand, a precipitate begins to form in the course of a few hours; and it is the formation of such precipitates in magnesium oxychloride cement mixtures that finally determines the character of the binding material.

On examining the initial precipitates in magnesium chloride solutions of various concentrations, I have found that the initial precipitates are alike when formed by a solution of the oxide and magnesium chloride of a concentration of 20° B. up to a concentrated solution of magnesium chloride at 25° C., the ratio of magnesium oxide to magnesium chloride in such initial precipitates being 5 mols. of MgO to 1 mol. of $MgCl_2$. If the concentration of the magnesium chloride is less than 20° B., the initial precipitates deviate from the ratio of 5 to 1 in the direction of an increased amount of magnesium oxide, such amount of oxide (or hydroxide) increasing with decrease in concentration of the magnesium chloride solutions.

I have also found that the precipitate which is in the ratio of 5 mols. of oxide to 1 mol. of chloride is relatively stable and resists atmospheric alteration to a greater degree than any other combination thereof; but if such a precipitate be exposed to or remain in contact with magnesium chloride in excess of the amount required to satisfy the ratio of 5 to 1, then new bodies are formed in the course of time, which bodies contain magnesium chloride in excess of such ratio and approach the probably limiting ratio of 3 mols. of magnesium oxide to 1 mol. of magnesium chloride. This slow change in the composition of the cementitious material I believe to be one of the causes of the breakdown of magnesia cements, where magnesium chloride is present in excess of the amount required to give the ratio of 5 mols. of magnesium oxide to 1 mol. of magnesium chloride.

In cases where magnesium chloride solutions below 20° B. are used and the initial precipitate contains magnesium oxide or magnesium hydroxide in excess of that required by the ratio of 5 mols. of magnesium oxide to 1 mol. of magnesium chloride, the excess of magnesium oxide is probably present as magnesium hydroxide, due to hydrolysis in the dilute chloride solutions. As magnesium hydroxide, in contrast to magnesium oxide, is only sparingly soluble in magnesium chloride solutions, conditions are unfavorable for the combination of magnesium hydroxide with magnesium chloride, so that the net effect is to produce cementitious products in which free and uncombined magnesium chloride is present in excess of the amount which has combined with initially available magnesium oxide. Such free magnesium chloride may then react with the reduced amount of the compound corresponding to the 5 to 1 ratio, thereby producing disintegration in the manner in which free magnesium chloride favors disintegration under any circumstances.

On the other hand, where magnesium oxide is present in such cements in excess of the ratio of 5 mols. of magnesium oxide to 1 mol. of magnesium chloride, I have found that the conditions are then favorable for atmospheric moisture to react with unaltered magnesium oxide and for atmospheric carbon dioxide to react with magnesium hydroxide and magnesium oxide, thereby favoring slow disintegration of products prepared under such conditions.

The theoretical ratio of 5 mols. of magnesium oxide to 1 mol. of $MgCl_2 6H_2O$ is 1.008.

In long experimentation with mixtures of aggregate, magnesium chloride, magnesium oxide and water, I have found that the upper limit of the ratio of magnesium chloride to magnesium oxide for the production of uniform resistant products is 1.26 mols. of magnesium chloride to 5 mols. of magnesium oxide, or one part by weight of magnesium oxide to 1.25 parts by weight of $MgCl_2 6H_2O$. The upper limit of the ratio of magnesium oxide to magnesium chloride for the production of uniform and serviceable products is 5 mols. of magnesium oxide to .86 mols. of magnesium chloride, or one part by weight of magnesium oxide to .84 part by weight of $MgCl_2 6H_2O$.

The deviations from the theoretical ratio toward excess chloride within the above limits are, in my opinion, due to the influence of aggregates on the two reagents causing a dispersion affecting intimate contact and completion of the reaction. On the other hand, deviation from the theoretical ratio in favor of excess magnesium oxide are, in my opinion, due to the fact that the state of subdivision of the oxide may not be favorable to the reaction of all of such material with the chloride.

When aggregate is mixed with magnesium oxide, magnesium chloride, and water to form a mass of the proper degree of plasticity for such mechanical manipulations as troweling, pressing or shaping, a limitation is set upon the proportions of the four ingredients, depending upon the plasticity desired.

The flow table devised by the United States Bureau of Standards in this regard extends from a "stiff trowel" mix to a "soft trowel" mix, or, in the units of such table, from 1.80 to 2.00 for a normal mixture for troweling, while 2.10 would represent a "soft trowel" mix. A relatively small amount of water will effect a considerable change in the consistency of the plastic mass. Hence the ratio in which the magnesium oxide, magnesium chloride, water and aggregate are mixed must be controlled within narrow limits, under my discoveries, if a durable and satisfactory product is to be obtained. The amount of aggregate added must be such that the addition of water to form a mass of the proper consistency for manipulation will not be in excess of that amount which would produce a solution of 16° B. if the amount of magnesium chloride used were dissolved therein; and the amounts of magnesium oxide and magnesium chloride should be within the ratio of 1 part by weight of magnesium oxide to from .84 to 1.24 parts by weight of $MgCl_2 6H_2O$.

Since the use of magnesium chloride solutions below 20° B. favor the formation of a precipitate too high in magnesium oxide or hydroxide, the aggregate should be such that the water required to bring the mass to the proper consistency should not reduce the specific gravity of the magnesium chloride solution below 20° B., or at the most, under conditions favoring the evaporation of water, below 16° B.

In commercial operation it is difficult to compound such a mixture within the limits of the favorable ratio, but if any deviation occurs it should be such as to prevent the ratio of magnesium chloride to magnesium oxide from exceeding 1 mol. to 5 mols., rather than allowing deviation to cause an excess of available oxide over that of the ratio. Where magnesium chloride is used in excess, the products are unduly hygroscopic and soon warp, lose strength, expand, and even disintegrate. This is due, I believe, to the formation of new bodies approaching a ratio of 3 mols. of magnesium oxide to 1 mol. of magnesium chloride. Where magnesium oxide is used in excess of the desirable ratio, undue disintegration is probably due to the slow hydration or carbonation of the unaltered or otherwise uncombined magnesium oxide. Hence any variation from the theoretical portions within my range should favor excess oxide.

The cementitious material may be employed neat or in combination with aggregates. Various types of aggregates may be employed with a considerable variation in the percentage of cementitious material used, provided the ratios of oxide to chloride are within my range, and when mixed for use the chloride is not diluted below that which produces a solution of 16° B. if the amount of magnesium chloride in the mixture were dissolved in the water required, and this ratio is preferably not below 20° B.

As an example of the favorable properties attained within my invention, I give the following mixtures of sand, silex, asbestos, calcined magnesium and magnesium chloride which were prepared in the proportions commonly practiced in the preparation of commercial plaster of the magnesium-oxychloride type. The ratio of magnesium oxide to magnesium chloride was changed in the mixture by substituting magnesium oxide for silex as the magnesium oxide ratio was increased.

Measurements of the tensile strength of the product give the following data:

| Ratio $\frac{MgCl_2 6H_2O}{Free\ MgO}$ | Tensile strength | | | | | | |
|---|---|---|---|---|---|---|---|
| | 1 day | 7 days | 28 days | 3 mo. | 6 mo. | 9 mo. | 1 yr. |
| 2.23 | 147 | 173 | 148 | 40 | 78 | 23 | 0 |
| 1.86 | 180 | 220 | 217 | 110 | 103 | 30 | 0 |
| 1.44 | 227 | 242 | 322 | 380 | 468 | 463 | 363 |
| 1.28 | 293 | 280 | 453 | 428 | 552 | 550 | 453 |
| 1.13 | 290 | 330 | 483 | 710 | 683 | 787 | 673 |
| 0.842 | 230 | 273 | 503 | 750 | 708 | 813 | 827 |
| 0.670 | 266 | 257 | 485 | 600 | 685 | 583 | 632 |
| 0.559 | 335 | 307 | 402 | 578 | 730 | 583 | 670 |

Also similar materials were subjected to measurements of expansion and contraction when stored at normal room temperature and humidity, this giving the following:

| Ratio $\frac{MgCl_2 6H_2O}{Free\ MgO}$ | Expansion in per cent | | | | | |
|---|---|---|---|---|---|---|
| | 7 days | 28 days | 3 mo. | 6 mo. | 9 mo. | 1 yr. |
| 2.23 | +0.012 | +0.014 | +0.5 | disintegrated | | |
| 1.86 | +0.015 | +0.026 | +0.5 | disintegrated | | |
| 1.44 | +0.041 | +0.032 | +0.390 | +0.377 | +0.406 | +0.400 |
| 1.28 | +0.026 | +0.019 | +0.124 | +0.124 | +0.149 | +0.123 |
| 1.13 | +0.120 | +0.126 | +0.139 | +0.139 | +0.135 | +0.132 |
| 0.842 | +0.241 | +0.246 | +0.219 | +0.219 | +0.232 | +0.208 |
| 0.670 | +0.5 | | sound | | | |
| 0.559 | +0.5 | | sound | | | |

Also tensile strength briquettes were made of similar materials and their resistance to disintegration by water was determined by immersing the briquettes in water at the ages and for the periods indicated in the following table, their tensile strength then being determined in pounds per square inch, giving the following:

| Ratio $\frac{MgCl_2 6H_2O}{Free\ MgO}$ | Aged 3 days Immersed 7 days | Aged 14 days Immersed 7 days | Aged 14 days Immersed 7 days Dried 7 days |
|---|---|---|---|
| 1.962 | 120 | 170 | 520 |
| 1.526 | 217 | 253 | 592 |
| 1.240 | 168 | 318 | 775 |
| 1.048 | 180 | 303 | 898 |
| .911 | 110 | 172 | 703 |
| .686 | (20) (Cracked) | (75) (Cracked) | 225 |

The advantages of my invention result from my discoveries as to the initial precipitate, the precipitate forming from the solution and the relations as regards theoretical combined proportions, in connection with preventing the magnesium chloride from being reduced below 16° B. Articles made within the ranges above stated are substantially uniform and of excellent resistant qualities, thus avoiding the variations in desirable characteristics which have heretofore been present in such plastic compositions.

The concentration of the $MgCl_2$ may extend from 16° upward to a concentrated solution as desired, different aggregates may be used, some of which of course will require more water for giving the proper consistency than others, and other variations may be made without departing from my invention.

I claim:

1. As a new composition of matter, a mixture of magnesium oxide, magnesium chloride and aggregate in such proportions that the amounts of magnesium oxide and magnesium chloride are within the ratio of one part by weight of magnesium oxide to form about .84 to 1.25 parts by weight of $MgCl_2 6H_2O$, and the ratio of the amount of aggregate to the combined amounts of magnesium oxide and magnesium chloride is such that the amount of water required to produce therefrom a mix of proper consistency for manipulation will not be in excess of that amount which would produce a solution of 16° B. if the amount of magnesium chloride in the mixture were dissolved therein.

2. The process consisting in mixing magnesium oxide, magnesium chloride and aggregate in such proportions that the amounts of magnesium oxide and magnesium chloride are within the ratio of one part by weight of magnesium oxide to from about .84 to 1.25 parts by weight of $MgCl_2 6H_2O$, and the ratio of the amount of aggregate to the combined amounts of magnesium oxide and magnesium chloride is such that the amount of water required to produce therefrom a mass of the proper consistency for manipulation will not be in excess of that amount which would produce a solution of 16° B. if the magnesium chloride used were dissolved therein.

3. As a new composition of matter, a mixture of magnesium oxide, magnesium chloride and aggregate in such proportions that the amounts of magnesium oxide and magnesium chloride are within the ratio of one part by weight of magnesium oxide to from about .84 to 1.25 parts by weight of $MgCl_2 6H_2O$, and the ratio of the amount of aggregate to the combined amounts of magnesium oxide and magnesium chloride is such that the amount of water required to produce therefrom a mix of proper consistency for manipulation will not be in excess of that amount which would favor the combination of all of the magnesium chloride with all of the magnesium oxide initially available for reaction.

4. The process consisting in mixing magnesium oxide, magnesium chloride and aggregate in such proportions that the amounts of magnesium oxide and magnesium chloride are within the ratio of one part by weight of magnesium oxide to from about .84 to 1.25 parts by weight of $MgCl_2 6H_2O$, and the ratio of the amount of aggregate to the combined amounts of magnesium oxide and magnesium chloride is such that the amount of water required to produce therefrom a mass of the proper consistency for manipualtion will not be in excess of that amount which would favor the combination of all of the magnesium chloride with all of the magnesium oxide initially available for reaction.

5. The process consisting in mixing magnesium oxide, magnesium chloride and aggregate in such proportions that the amounts of magnesium oxide and magnesium chloride are within the ratio of one part by weight of magnesium oxide to from about .84 to 1.25 parts by weight of $MgCl_2 6H_2O$, and the ratio of the amount of aggregate to the combined amounts of magnesium oxide and magnesium chloride is such that the amount of water required to produce therefrom a mass of the proper consistency for manipulation will not be in excess of that amount which would produce a solution of 16° B. if the magnesium chloride in the mixture were dissolved therein, and adding the proper amount of water and forming a plastic mix of said materials.

In testimony whereof I have hereunto set my hand.

HIRAM S. LUKENS.